United States Patent
Aitchison et al.

(10) Patent No.: US 6,851,255 B2
(45) Date of Patent: Feb. 8, 2005

(54) NORMALLY OPEN REVERSE FLOW FLAPPER VALVE

(75) Inventors: Paul Archibald Aitchison, Hamilton (CA); Patrick David Germain, Outremont (CA); Henry Smith, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 90 days.

(21) Appl. No.: 10/321,521

(22) Filed: Dec. 18, 2002

(65) Prior Publication Data

US 2004/0118105 A1 Jun. 24, 2004

(51) Int. Cl.[7] .................... F02C 7/18; F16K 15/03
(52) U.S. Cl. .................... 60/39.83; 60/782; 137/521
(58) Field of Search ..................... 60/782, 785, 806, 60/39.83

(56) References Cited

U.S. PATENT DOCUMENTS

| | | | | |
|---|---|---|---|---|
| 2,548,794 A | * | 4/1951 | Hots et al. ............... | 60/39.83 |
| 2,749,087 A | * | 6/1956 | Blackman et al. ......... | 60/39.83 |
| 2,890,716 A | | 6/1959 | Werder | |
| 2,890,717 A | | 6/1959 | Werder | |
| 3,000,395 A | | 9/1961 | Waterfill | |
| 3,191,615 A | | 6/1965 | Edwards et al. | |
| 3,559,679 A | | 2/1971 | Smirra | |
| 3,718,156 A | | 2/1973 | Fujii | |
| 4,043,358 A | | 8/1977 | Sliski ..................... | 137/512.1 |
| 4,301,833 A | | 11/1981 | Donald, III ............. | 137/521 |
| 6,000,210 A | * | 12/1999 | Negulescu ............... | 60/39.83 |
| 6,722,137 B2 | * | 4/2004 | Proctor et al. ........... | 60/782 |

FOREIGN PATENT DOCUMENTS

| | | |
|---|---|---|
| DE | 1227743 | 10/1966 |
| EP | 0968918 A2 | 5/1999 |
| GB | 2073404 A | 10/1981 |

* cited by examiner

*Primary Examiner*—Michael Koczo
(74) *Attorney, Agent, or Firm*—Ogilvy Renault

(57) ABSTRACT

A fluid flow actuated valve for controlling the fluid flow in a conduit comprises a support structure adapted to be mounted within the conduit and at least one flap member pivotally mounted to the support structure. The at least one flap member is pivotable between an first position for a minimum fluid flow and a second position for a maximum fluid flow. A torsion spring is attached to the at least one flap member to urge the same to pivot against a fluid pressure differential, from the first position to the second position when the fluid pressure differential is smaller than a predetermined level.

11 Claims, 7 Drawing Sheets

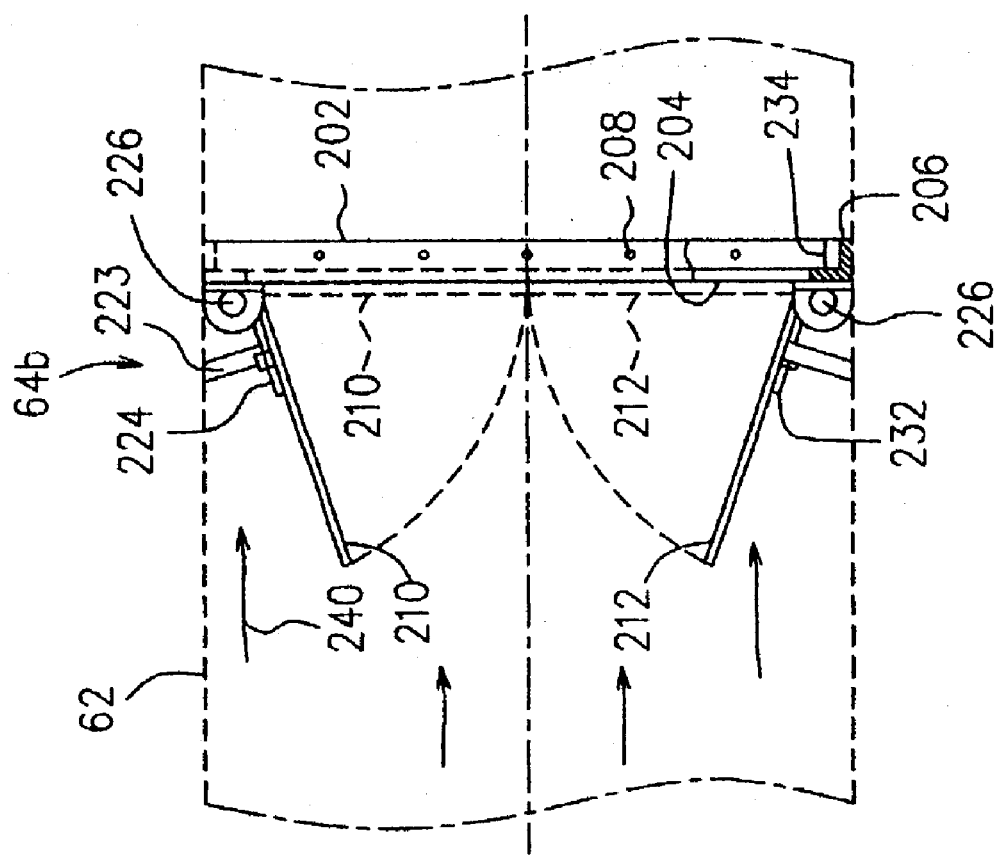
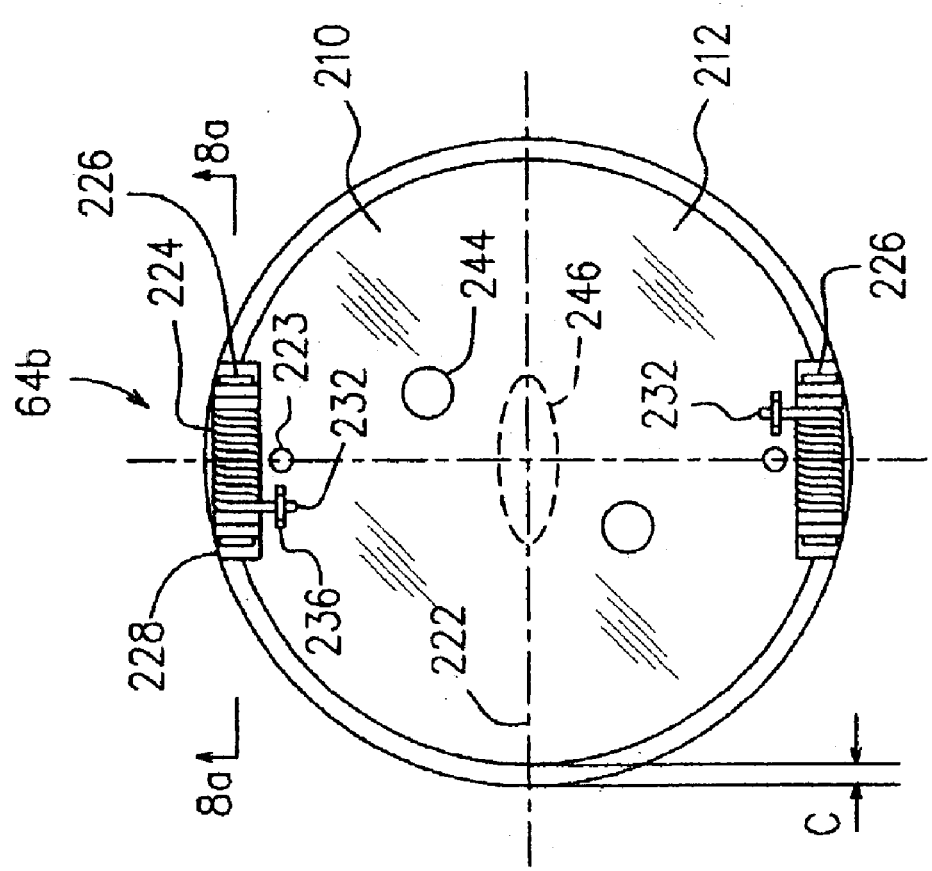
FIG. 5
FIG. 4

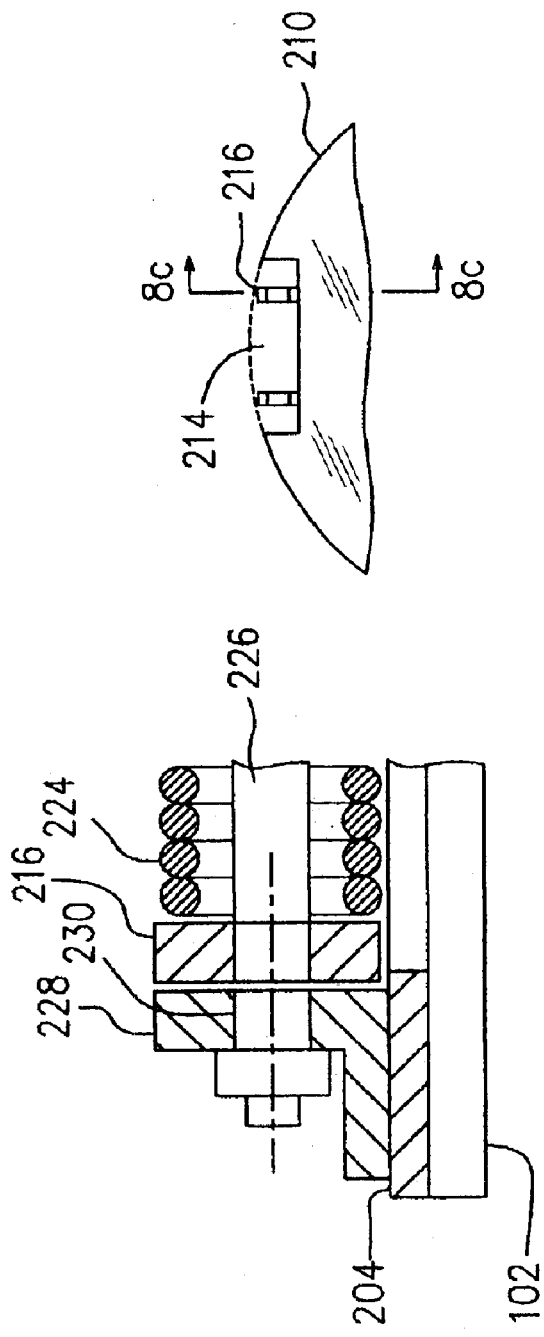

NORMALLY OPEN REVERSE FLOW FLAPPER VALVE

FIELD OF THE INVENTION

The field of the invention is in the area of valves for controlling the fluid flow in a conduit, and particularly relates to a flow actuated valve for controlling fluid flow in a conduit of cooling systems of aircraft gas turbine engines.

BACKGROUND OF THE INVENTION

Electrical and mechanical equipment often requires cooling while in operation. Both liquid (e.g. oil) and gas (e.g. air) cooling schemes are well known. Air cooling schemes may be either active (e.g. fan driven) or passive (i.e. rely on an existing pressure gradient to introduce a flow of cooling air to the equipment). In gas turbine engine applications employing a passive air cooling scheme to cool the on-board generator(s), a minimum amount of airflow is required to cool the generator. A pipe that is attached to the bypass duct on the gas turbine engine has been sized to allow this minimum mass flow of air when the air pressure difference between the bypass duct and the atmosphere is very small, for example approximately 2 lbs. per square inch differential (PSID). This is the condition at idle of the gas turbine engine when the aircraft is on the ground. When the engine speed is increased for takeoff or flight conditions, the pressure difference between the bypass duct and atmosphere is increased to approximately 10 PSID. This causes more cooling air than is required to cool the generator, to flow through the pipe. The resulting oversupply of cooling air increases the Specific Fuel Consumption (SFC) of the gas turbine engine. Therefore it is desirable to use a valve to control the cooling airflow through the pipe between the bypass duct and the generator.

Fugii describes an automatic airflow smoothing valve in his U.S. Pat. No. 3,718,516 issued on Feb. 27, 1973, for ensuring a constant output flow in spite of great changes of the pressure of the input airflow. Fugii's valve includes a hollow, elongated open-ended casing, and a rod is mounted in the upper end of the casing and depends therealong. A primary coiled extension spring is mounted on the rod and a pair of secondary coiled extension springs are attached at their upper ends to the primary coiled extension spring to form a star connection. A pair of flapper disc halves hinged together are pivotally mounted within the casing at the lower end thereof. The lower ends of the secondary coiled extension springs diverge from the primary coiled extension spring and are attached to the respective flapper disc halves. Perforations are provided in the flapper disc halves to permit airflow when the valve is closed against the spring forces by the input airflow under relatively high pressure. When the pressure of the input airflow is reduced, the extended springs cause the valve to open to an extent corresponding to the pressure of the input airflow, in order to ensure the constant output airflow.

Smirra describes a hinge valve in his U.S. Pat. No. 3,559,679, issued on Feb. 2, 1971 for controlling fluid flow in a conduit. Smirra's valve comprises a support member extending diametrically across the interior of the conduit. Two flap members pivotally mounted to the support member are adapted to move from an open position allowing flow of fluid through the conduit to a closed position preventing flow of fluid. The flap members are actuated by a piston that is pivotally attached to linkage connecting the flap members and moves within a hydraulic cylinder under fluid pressure or spring force. Both Fugii's and Smirra's valves are complicated and include more moving parts than the two flap members, which compromises the reliability of their valves. Both Fugii's and Smirra's valves include coiled extension or compression springs positioned axially within the casing or the conduit, which cause the corresponding parts to move axially such that the valves cannot be made compact in the axial dimension.

The cooling system of an aircraft gas turbine engine requires a valve that does not necessarily maintain a constant output volume of airflow, but must be very reliable in performance, and compact in size to reduce the weight thereof. Therefore, there is a need to develop an improved valve to be used in the cooling system of aircraft gas turbine engines in order to control the cooling airflow to the generator.

SUMMARY OF THE INVENTION

One object of the present invention is to provide a fluid flow actuated valve for controlling the fluid flow in a conduit, which is compact in size, light in weight and reliable in performance.

In accordance with one aspect of the present invention, a fluid flow actuated valve for controlling the fluid flow in a conduit comprises a support structure adapted to be mounted within the conduit. At least one flap member is pivotally mounted to the support structure and is pivotable between a first position for a minimum fluid flow passage and a second position for a maximum fluid flow passage. A torsion spring is attached to the at least one flap member to urge the same to pivot against a fluid pressure differential from the first position to the second position when the fluid pressure differential is smaller than a predetermined level. It should be noted that for the purpose of this specification and the appended claims, the term "minimum fluid flow" means a non-zero fluid flow such that the valve of the present invention is distinguished from conventional check valves.

The torsion spring is preferably disposed such that an axis of torsion spring is superposed on a pivoting axis of the at least one flap member. For example, the torsion spring can be a coiled torsion spring surrounding a shaft on which the at least one flap member is pivotally mounted.

In accordance with another aspect of the present invention, a fluid flow actuated valve is provided for controlling the fluid flow in a conduit. The valve includes a support ring adapted to be mounted within the conduit. Two flap members are pivotally mounted to the support ring, respectively, and are pivotable between a first position for a minimum fluid flow passage and a second position for a maximum fluid flow passage. Spring means including at least one or more springs are disposed in a position in which an axial axis of each spring is substantially perpendicular to an axial axis of the support ring. The spring means urge the flap members against the fluid pressure differential smaller than a predetermined level, to pivot from the first position to the second position. The spring means permit the flap members under a fluid pressure differential not smaller than the predetermined level, to pivot from the second position to the first position.

The flap members in the first position preferably extend transversely across the support ring while forming the minimum flow passage. The respective flap members in the second position preferably extend axially and radially with respect to the support ring such that the valve is open to form the maximum fluid flow passage In one embodiment of the present invention, a shaft diametrically extends across the support ring and is secured thereto. The respective flap members are pivotally mounted to the shaft. The at least one spring is attached to the respective flap members to urge the flap members to pivot towards each other until the respective flap members are stopped in an angularly spaced-apart position by a spacer secured to the respective flap members.

In another embodiment of the present invention the support ring includes a pair of pivoting pins secured to the support ring at diametrically opposed positions thereon. The pair of pivoting pins are parallel with and symmetrical about a diametrical line of the support ring. The flap members are pivotally mounted to the respective pivoting pins, and are urged to pivot away from each other by the spring means until the flap members arrive in the second position.

The fluid flow actuated valve of the present invention is simple in configuration and has fewer moving parts in contrast to the prior art valves, and thereby advantageously ensures reliability in performance, in order to meet the requirements of gas turbine engines used in aircraft. The fluid flow actuated valve of the present invention is advantageously light in weight, and compact in size particularly in the axial dimension. The axial dimension of such valves can be made substantially smaller than the diameter of the conduit within which the valves are installed, such that the valves of the present invention can fit between the bypass duct and the cooling pipe to the generator without obstructing the bypass flow.

In accordance with a further aspect of the present invention, a passive air cooling apparatus for an aircraft-mounted gas turbine engine and an aircraft-mounted gas turbine engine having such a passive air cooling apparatus are provided. The gas turbine engine has an airflow passing therethrough. The passive air cooling apparatus comprises a conduit adapted to divert a cooling airflow from the airflow to at least a portion of an engine system to be cooled. A valve is disposed in the conduit and is positionable between a first position in which the cooling airflow through the conduit is partially blocked by the valve, and a second position in which the cooling airflow is substantially unblocked by the valve. The valve is biased towards the second position. When a pressure differential sufficient to overcome the biasing of the valve towards the second position is applied across the valve in the conduit, the valve is moved by the pressure differential to the first position.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which:

FIG. 4 is a plan view of a valve according to another embodiment of the present invention, showing the valve in a closed position forming a minimum airflow passage;

FIG. 5 is an elevational side view of the embodiment of FIG. 4, showing the valve in an open position forming a maximum airflow passage;

FIG. 7 is a partial cross-sectional view taken along line 7—7 in FIG. 6a;

FIG. 8a is a partial cross-sectional view taken along line 8a—8a in FIG. 4;

FIG. 8b is a partial plan view of one of the flap members used in the embodiment of FIG. 4;

FIG. 8c is a cross-sectional view taken along line 8c—8c in FIG. 8b, showing a bracket used in the embodiment of FIG. 4 for supporting a pivoting pin;

FIGS. 9a and 9b are partial cross-sectional views of a conduit with the valves installed therein according to further alternative embodiments of the present invention;

DETAILED DESCRIPTION OF THE PREFERRED EMBODIMENTS

Figure 1:
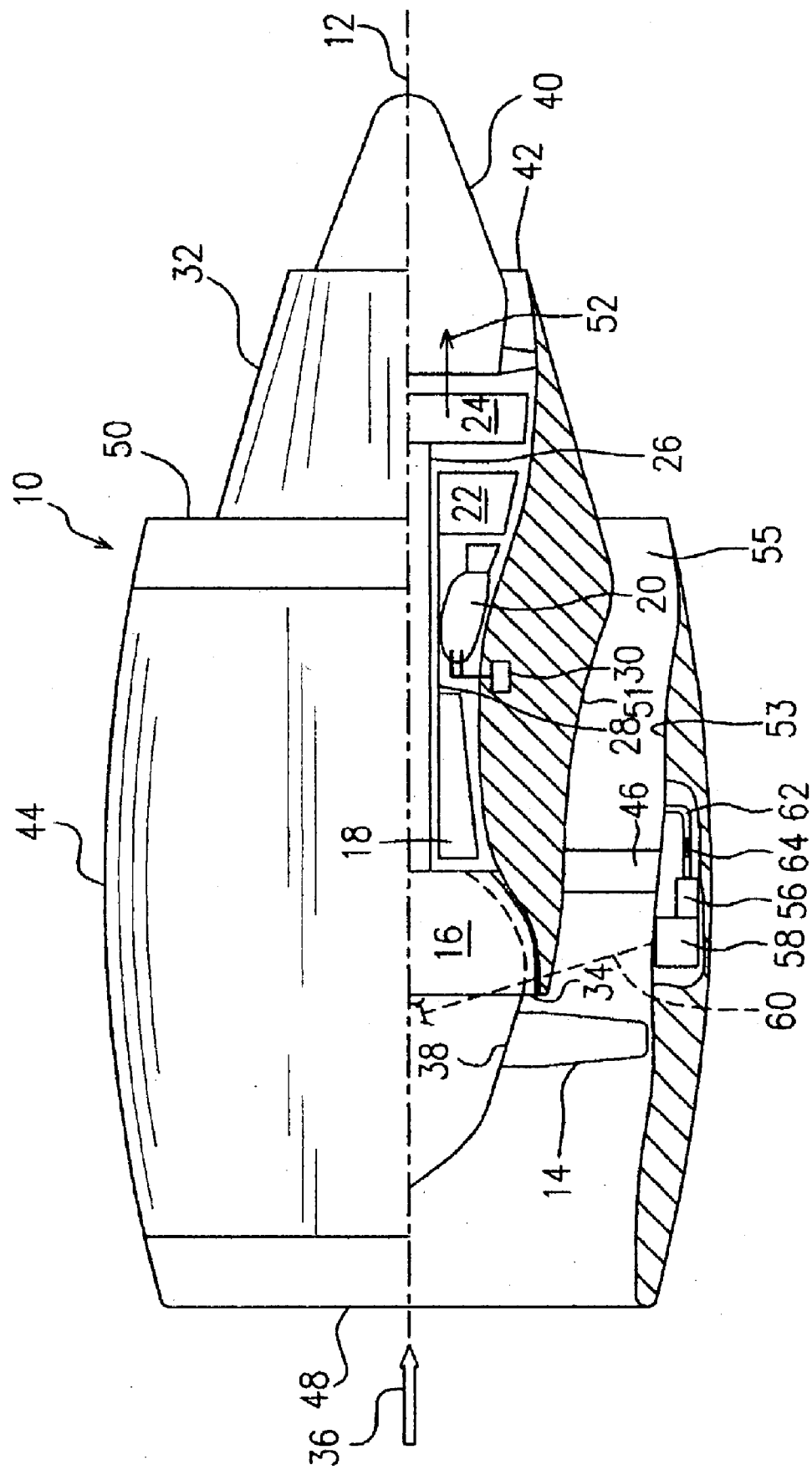
FIG. 1 is a schematic illustration in a partial cross-sectional view, showing an aircraft gas turbine engine having a "short-cowl" nacelle and incorporating a valve.

Referring to the drawings, particularly FIG. 1, an exemplary aircraft gas turbine engine 10 includes in serial flow communication about a longitudinal centerline axis 12, a fan having a plurality of circumferentially spaced apart fan blades 14, a low pressure compressor 16, a high pressure compressor 18, an annular combustor 20, a high pressure turbine 22 and a low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Fuel injecting means 30 are provided for selectively injecting fuel into the combustor 20 for powering the engine 10.

An annular casing 32 surrounds the engine 10 from the low pressure compressor 16 to the low pressure turbine 24 and defines, with the low pressure compressor 16, a low pressure compressor inlet 34 for receiving a portion of ambient air 36. The downstream end of the casing 32 defines with an annular exhaust plug 40, an annular exhaust outlet 42. A portion of the air 36 compressed by the fan blades 14 adjacent to blade roots 38, is further compressed by the low pressure compressor 16 and the high pressure compressor 18 and is forced into the combustor 20. The mixture of the compressed air 36 and the fuel injected by the fuel injecting means 30 generates combustion gases 52. The combustion gases 52 cause the high pressure turbine 22 and the low pressure turbine 24 to rotate respectively for powering the high pressure compressor 18, low pressure compressor 16 and the fan blades 14.

Figure 10:
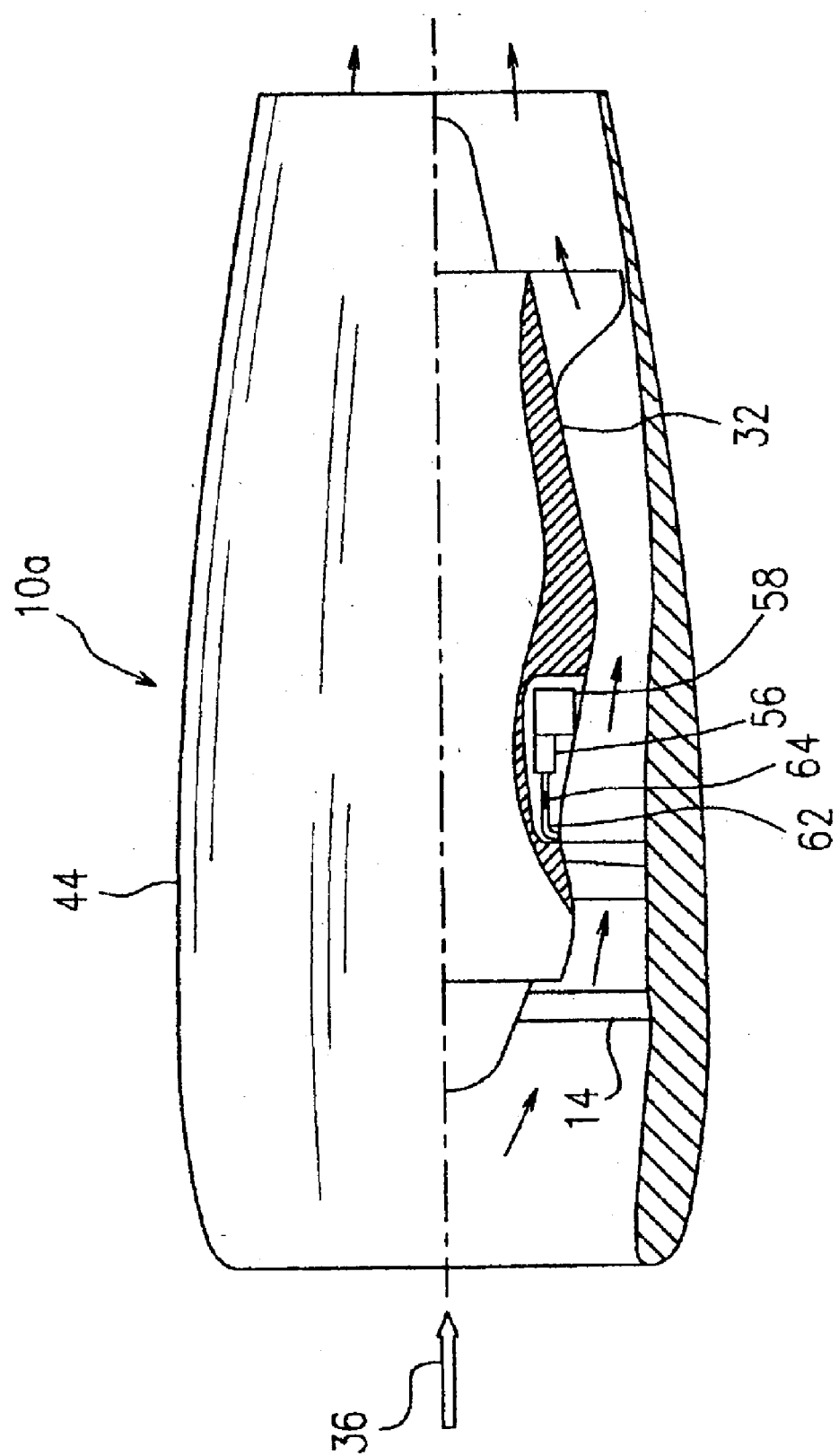
FIG. 10 is a schematic illustration in a partial cross-sectional view, showing an aircraft gas turbine engine having a "long-cowl" nacelle and incorporating a valve of the present invention.

A nacelle 44 is provided to surround the engine and forms an annular bypass duct 55. (FIG. 1 shows a "short-cowl" nacelle, but it will be recognized that a "long-cowl" nacelle could also be used, as shown in FIG. 10). The annular bypass duct 55 is defined by an outer bypass duct wall 53 which is an inner periphery of the nacelle 44, and an inner bypass duct wall 51 which is a portion of the engine casing 32. A radially outer portion of the air 36 compressed by the fan blades 14 bypasses the engine through the bypass duct 55. A plurality of circumferentially spaced intercase struts 46 extend radially between the inner and outer bypass duct walls 51 and 53. The nacelle 44 includes an inlet 48 at its upstream end for receiving the ambient air 36, and an outlet 50 for discharging a portion of the air 36 compressed by the fan blades 14 past the bypass duct 55, for providing a portion of thrust. A generator 56 (in this case, a direct current DC generator is used, though an alternating current AC generator may also be used) and a gear box 58 are installed in the nacelle 44 and disposed outside the outer bypass duct wall 53. A power shaft which is schematically illustrated by a broken line 60 transmits torque from the engine shaft 26 to the gear box 58 for driving the connected generator 56. A cooling conduit 62 is provided in fluid communication with the bypass duct 55 and the generator 56, to deliver cooling air to cool the generator 56.

In the prior art, the cooling air through the conduit 62 is not controlled and the conduit 62 is designed to deliver a minimum air mass flow necessary for cooling the generator 56 when the engine 10 is idling and the flow pressure difference between the two ends of the conduit 62 is relatively small. However, the amount of cooling air passing through the conduit 62 is much greater than necessary for cooling the generator 56 when the engine 10 is at a high setting for take-off and cruise of aircraft, and the flow pressure difference between the two ends of the conduit 62 is significantly increased, which causes thrust loss and fuel waste. In order to solve this problem, a flapper valve 64 of the present invention is installed in the conduit 62 to control the cooling air delivered to the generator 56 when the engine 10 changes its setting. The flapper valve 64 is described in detail below.

Figure 3:
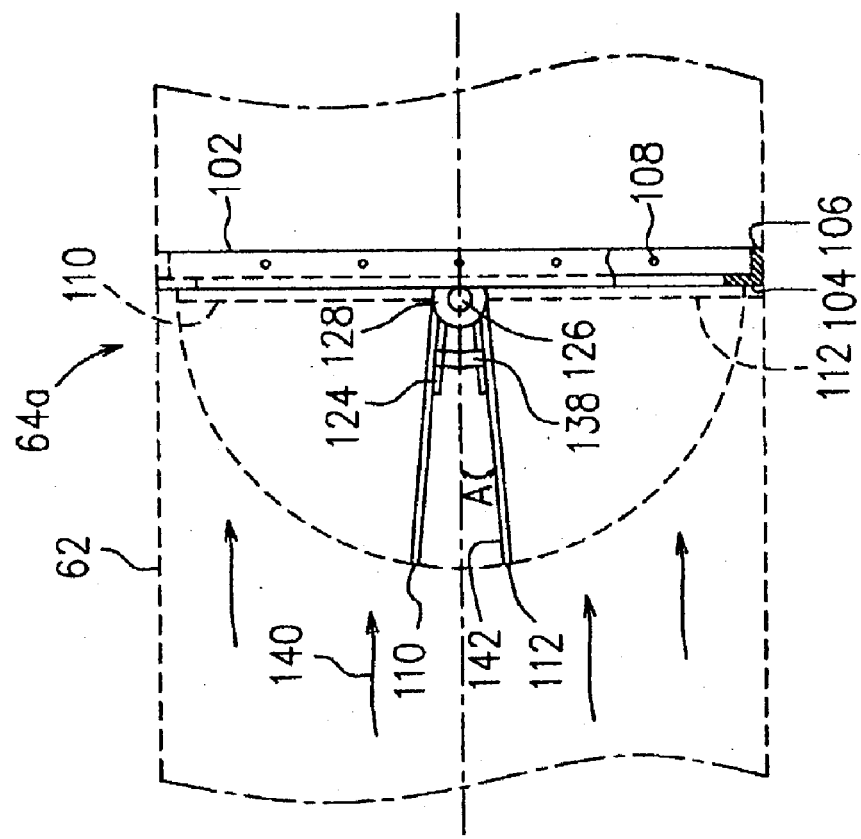
FIG. 3 is an elevational side view of the embodiment of FIG. 2, showing the valve in an open position forming a maximum airflow passage.
Figure 2:
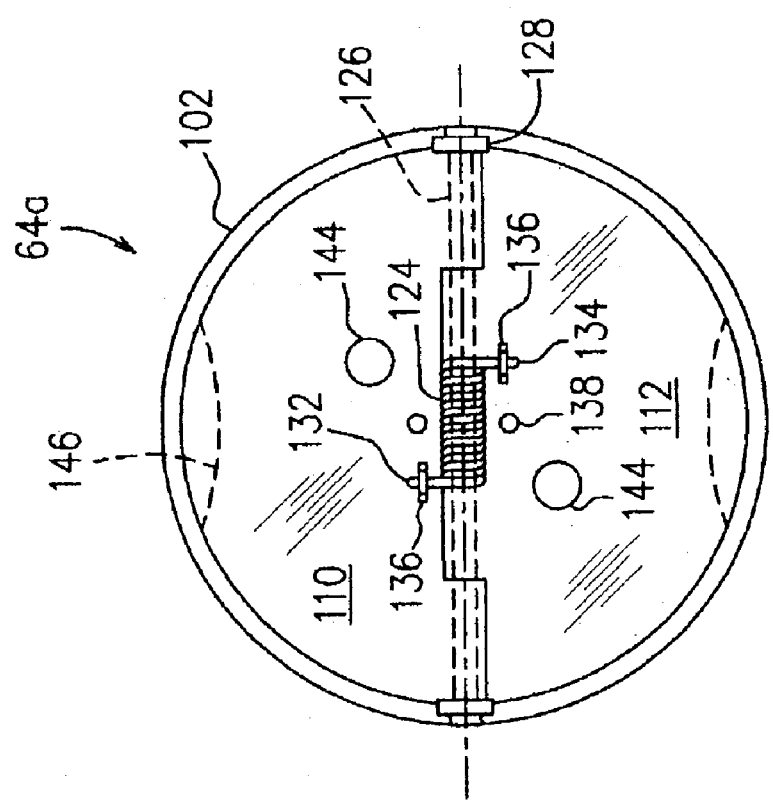
FIG. 2 is a plan view of a valve according to one embodiment of the present invention, showing the valve in a closed position forming a minimum airflow passage.

In FIGS. 2 and 3 a flapper valve 64a according to one embodiment of the present invention includes a support structure having a support ring 102. The support ring 102 has a diameter slightly smaller than the inner diameter of the conduit 62, which is shown by broken lines in FIG. 3, such that the support ring 102 can be fitted within conduit 62. The support ring 102 includes an annular radial surface 104 and an annular flange 106 axially extending from the radial surface 104 to form an external periphery of the support ring 102. A plurality of mounting holes 108 on the flange 106 receive mounting screws (not shown) to secure the valve 64a to the conduit 62.

Figure 6B:
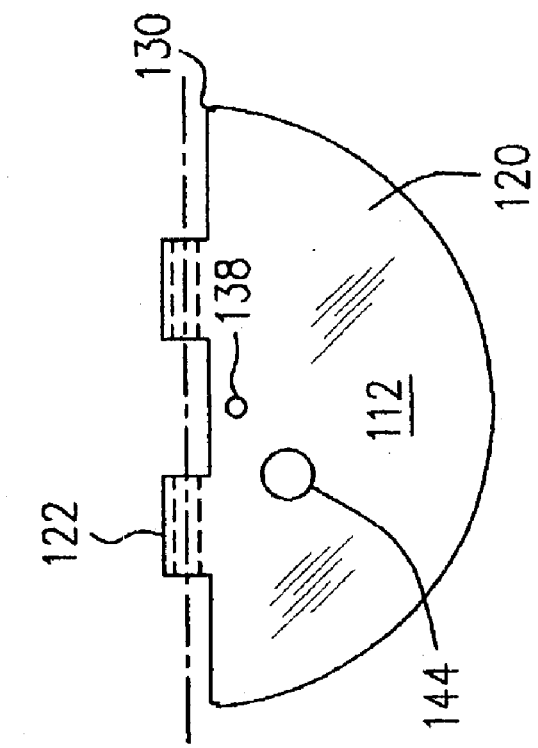
FIGS. 6a and 6b are plan views of the respective flap members used in the embodiment of FIG. 2.
Figure 6A:
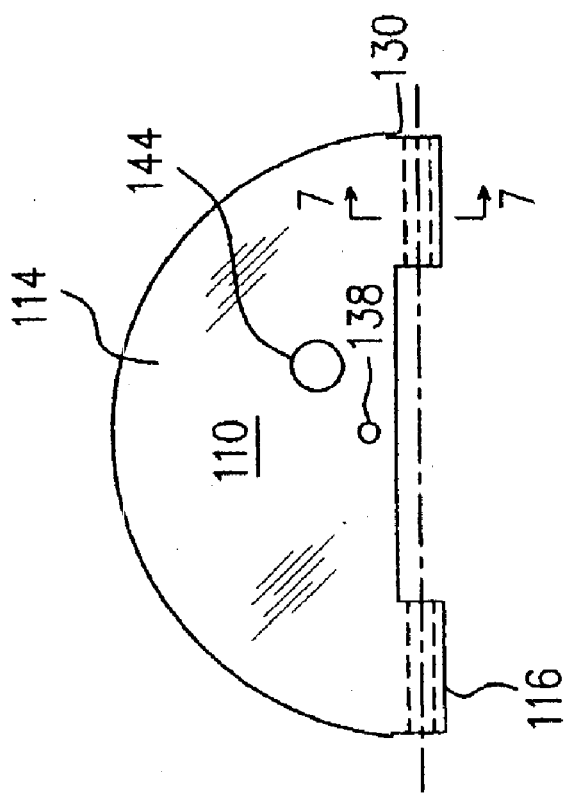
Figure 7:
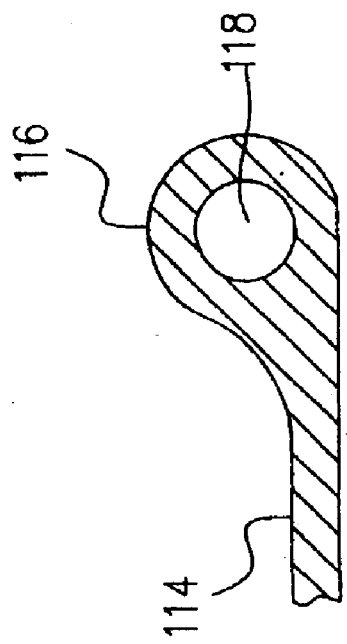

A pair of flap members 110 and 112 are pivotally mounted to the support ring 102. The respective flap members 110 and 112 are generally halves of a circular plate, as shown in FIG. 2. The flap member 110 which is more clearly illustrated in FIG. 6a, includes a substantially semi-circular plate 114 and two sleeve members 116 attached to or integrally formed with the plate 114. The two sleeve members 116 are spaced apart from each other and have their holes 118 (see FIG. 7) aligned with each other. Similarly to flap member 110 and as more clearly shown in FIG. 6b, flap member 112 includes a substantially semi-circular plate 120 and two sleeve members 122 which are spaced apart and aligned with each other. The space between the two sleeve members 122 of the flap member 112 is selected to accommodate a coiled torsion spring 124. The space between the sleeve members 116 of the flap member 110, is much greater than the space between sleeve members 122 of the flap member 112, in order to accommodate the two sleeve members 122 and the coiled torsion spring 124 so as to form a complete circular plate adapted to extend across the support ring 102 when the flap members 110 and 112 are pivotally mounted to the support ring 102, as shown in FIG. 2.

Referring again to FIGS. 2 and 3, a shaft 126 extends diametrically across the support ring 102 and is mounted to the annular radial surface 104 by a pair of support plates, or lugs, 128. Alternately, shaft 126 can be press fit into support ring 102. The sleeve members 116 of the flap member 110 and sleeve members 122 of the flap member 112, as well as the coiled torsion spring 124, are rotatably received on the shaft 126. Thus, the flap members 110 and 112 are pivotable about the shaft 126 between an open position as shown in FIG. 3 and a closed position as shown in FIG. 2. The closed position is also shown in broken lines in FIG. 3. Each flap member 110 and 112 has cut-outs 130 at their respective corners (more clearly shown in FIGS. 6a and 6b) to accommodate the support plates 128 in order to avoid interference with the pivoting movement of the respective flap members 110 and 112.

A torsion spring can be twisted by a torque and the twisted torsion spring will recover its original configuration when the applied torque is removed. The coiled torsion spring 124 used in this embodiment includes a first end 132 and a second end 134 which are attached to the respective flap members 110 and 112 by bracket 136. The brackets 136 are secured to the respective flap members 110 and 112 by well known means, for example screws (not shown). The coiled torsion spring 124 is pre-twisted when it is installed in the valve 64a such that the coiled torsion spring 124 urges the flap members 110 and 112 to pivot towards each other until the pivotal movement thereof is stopped by two stop members 138 as shown in FIG. 3, to form the open position of the valve 64a. Thus, the valve 64a functions as a normally open valve. The stop members 138 are sized and positioned such that the respective flap member 110 and 112 extend axially and radially with respect to the support ring 102 and are positioned at a predetermined angle A relative to the axial axis of the support ring 102.

The valve 64a is installed in the conduit 62 in a reversed manner such that the flap members 110 and 112 pivot to open towards the upstream direction of an airflow 140 in the conduit 62. In such an arrangement, when the pressure differential of the airflow 140 reaches a predetermined level, and the force acting on an upstream side 142 of the respective flap members 110 and 112 caused by the pressure differential of the airflow 140, is great enough to overcome the torque produced by the twisted coiled torsion spring 124, the respective flap members 110 and 112 are pushed by the airflow 140 to pivot away from each other until the respective flap members 110 and 112 extend transversely with respect to the conduit 62 and abut the annular radial surface 104 of the support ring 102. This is the closed position of the valve 64a.

The respective flap members 110 and 112 include for example, an aperture 144 to form air passages, in order to permit airflow 140 to pass through the valve 64a when the flap members 110 and 112 are in their closed position. The size and number of the apertures 144 are predetermined to meet the requirements of the minimum cooling airflow mass for the generator 56 when the gas turbine engine 10 is at a high setting and the valve 64a is closed.

The stop members 138 are sized to determine the angle A such that the open position of the valve 64a meets the requirements of a maximum cooling airflow for the generator 56 when the engine 10 is in a lower setting, and meets the requirements for valve actuation such that the flap members 110 and 112 are actuated by the airflow 140 at a predetermined pressure differential level to pivot to close the valve 64a. The size, number and location of the apertures 144 also affect the actuation of the flap members 110 and 112, and therefore the predetermined airflow pressure differential level is also taken into consideration when the apertures 144 are designed.

Thus, the valve 64a eliminates any axially moving parts and reduces the number of moving parts to a minimum level, thereby providing a compact configuration and increasing the reliability, which is required by gas turbine engines used in aircraft. More specifically, the compact configuration of valve 64a has an axial dimension thereof substantially smaller than a diametrical dimension thereof, which is desirable for use in aircraft gas turbine engines.

FIGS. 4 and 5 illustrate another embodiment of the present invention. A valve 64b according to this embodiment of the present invention, includes a support ring 202 which is similar to the support ring 102 of FIG. 3. The support ring 202 includes an annular radial surface 204 and an annular flange 206 axially extending from the radial surface 204 to form an external periphery of the support ring 202. A plurality of mounting holes 208 on the flange 206 receive mounting screws (not shown) to secure the valve 64b to the conduit 62.

Flap members 210 and 212 are pivotally mounted to the support ring 202 and are pivotable between an open position as shown in FIG. 5 for the maximum cooling airflow to the generator 56 of FIG. 1, when the airflow 240 is smaller than a predetermined pressure differential level, and a closed position, as shown in FIG. 4 (also shown by the broken line of the flap members 210, 212 in FIG. 5) to form passages to permit a minimum cooling airflow through the valve 64b when the airflow is not smaller than the predetermined pressure differential level. In particular, the flap members 210 and 212 are pivotally mounted on pivoting pins 226, respectively. The pivoting pins 226 are secured to the support ring 202 at diametrically opposed positions thereon. The pivoting pins 226 are parallel with and symmetrical about a diametrical line 222 of the support ring 202. The flap members 210 and 212 are identical to each other and so for simplification of description only the flap member 210 is described in detail below.

The flap member 210 is substantially semi-circular and has a cut-out 214 (see FIG. 8b) to accommodate a coiled torsion spring 224, support brackets 228 as shown in FIGS. 8a to 8c, and two hinge plates 216. The two hinge plates 216 are attached, for example by welding to the edge of the cut-out 214 of the flap member 210. The hinge plates 216 include a hole 218 extending therethrough for receiving a pivoting pin 226 extending therethrough. The hinge plates 216 are positioned spaced apart from each other and spaced apart from the respective two ends of the cut-out 214 such that the coiled torsion spring 224 which surrounds the pivoting pin 226 is received between the two hinge plates 216, and the respective support brackets 228 which are secured to the radial surface 204 of the support ring 202 are received in the cut-out 214 out of the hinge plates 216. Each of the support brackets 228 includes a hole 230 to receive the pivoting pin 226. Thus, the flap member 210 can freely pivot about the pivoting pin 226 between its open position and the closed position, as shown by broken lines in FIG. 5. The flap member 210 includes an aperture 244 to form the air passage for the minimum cooling airflow when the valve 64b is closed.

The coiled torsion spring 224 has two ends 232 and 234 (see FIG. 5). One end 232 is attached to the respective flap members 210 and 212 by a bracket 236 and the other end 234 is attached to the support ring 202, for example extending through a hole or notch (not shown) and abutting the inner periphery of the axial wall 206 of the support ring 202 as shown in FIG. 5. The coiled torsion spring 224 is installed in a pre-loaded condition such that the flap members 210 and 212 are normally urged to their open position. The diametrical dimension of the two semi-circular halves of the flap members 210 and 212 must be smaller than the external diameter of the support ring 202 which is fitted within the conduit 62. The straight edge of each of the flap members 210 and 212 which is on the diametrical line 222 of the support ring 202 when the flap members 210 and 212 are in the closed position as shown in FIG. 4, move away from this diametrical line 222 in opposite directions. The clearance between the inner periphery of the conduit 62 and the respective opposed ends of the straight edge of the flap member 210 becomes smaller when the flap members 210 and 212 pivot to open and the straight edge moves away from the diametrical line 222 because of the circular shape of the inner periphery of the conduit 62. Thus, the pivotal movement of the flap members 210 and 212 is restricted to a certain degree by the inner periphery of the conduit 62, depending on the amount of clearance. Stoppers 223 preferably stop the respective flap members 210, 212 before they contact the inner conduit wall. The stopper shape and position, and the flapper shape relative to the inner conduit wall may be adjusted to "tune" the valve in order to meet the desired maximum cooling airflow. The number and size of the apertures 244 in the flap members 210 and 212 are determined in order meet the requirements for the desired minimum cooling airflow when the valve 64b is closed. Furthermore, the threshold pressure differential level, at which the valve is actuated to close, is also considered in design when the number, size and location of the apertures 244 and the opening angle of the flap members 210 and 212 are chosen to suit the specific performance requirements of the valve.

Referring to FIGS. 2–5 again, the air passage for the minimum cooling airflow when the valve 64a or 64b is closed, can be alternatively arranged. The apertures 144 and 244 can be replaced by cut-outs in the flap members, as for example shown by broken lines 146 and 246.

In further embodiments illustrated in FIGS. 9a and 9b, the air passage for the minimum cooling airflow when the valve is closed can be formed as an annular passage 350 or 450. The annular passage 350 is formed between the inner periphery of the support ring 302 and the external periphery of the flap member 310. The support ring 302 is fitted within the conduit 62 and has a plurality of stop members 352 circumferentially spaced apart from one another and extending radially inwardly. The flap member 310 has a diametrical dimension smaller than the internal diameter of the support ring 302 and abuts the plurality of stop members 352 when in its closed position. The annular passage 450 is formed between the inner periphery of the conduit 62 and the support ring 402 which is secured within the conduit 62, and is radially spaced apart therefrom by a plurality of spacers 452. Thus, when the flap member 410 in its closed position abuts the support ring 402, the annular passage 450 is left open for the minimum cooling airflow to pass therethrough.

Other configurations may be arranged for the minimum cooling airflow passage when the valve is closed. The above described are examples only. Other changes may also be made to the described embodiments of the present invention. For example in the configuration of the embodiment illustrated in FIGS. 4 and 5, the number of the flap members may change. A substantial circular flap member can be used to replace the two semi-circular halves and only one coiled torsion spring is needed. However, such an embodiment will increase the axial dimension of the valve. Three or more flap members which make up a complete circular plate may also be used if desired.

Figure 9D:
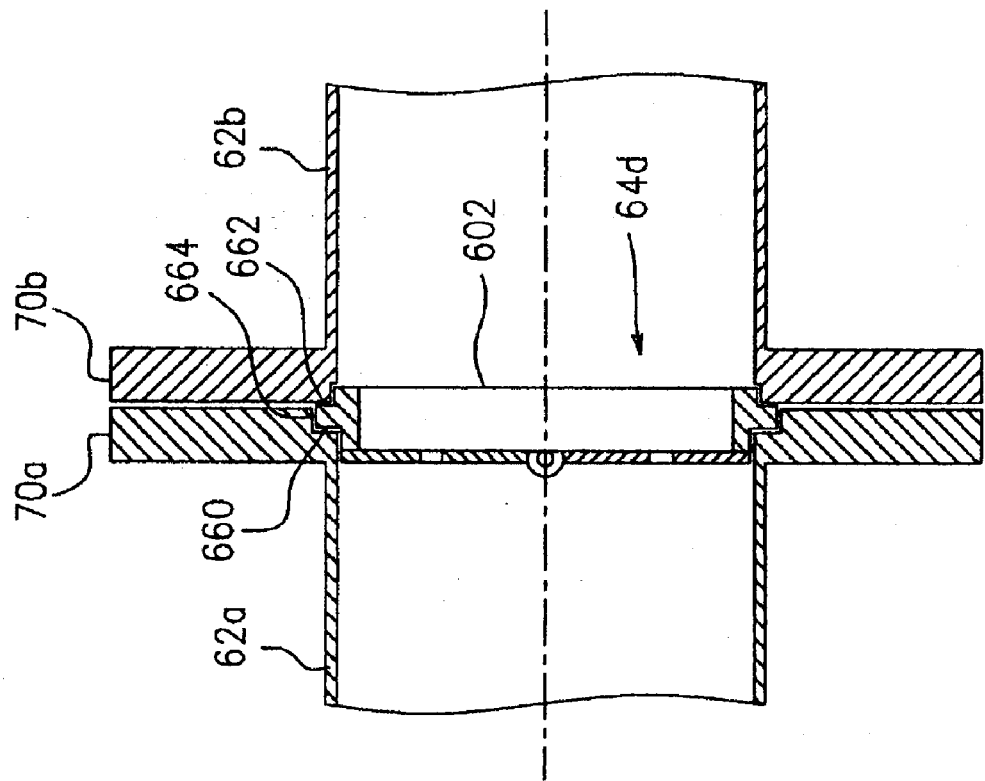
FIGS. 9c and 9d are cross-sectional views of a section of a conduit with the valves installed therein according to still further alternative embodiments of the present invention.
Figure 9C:
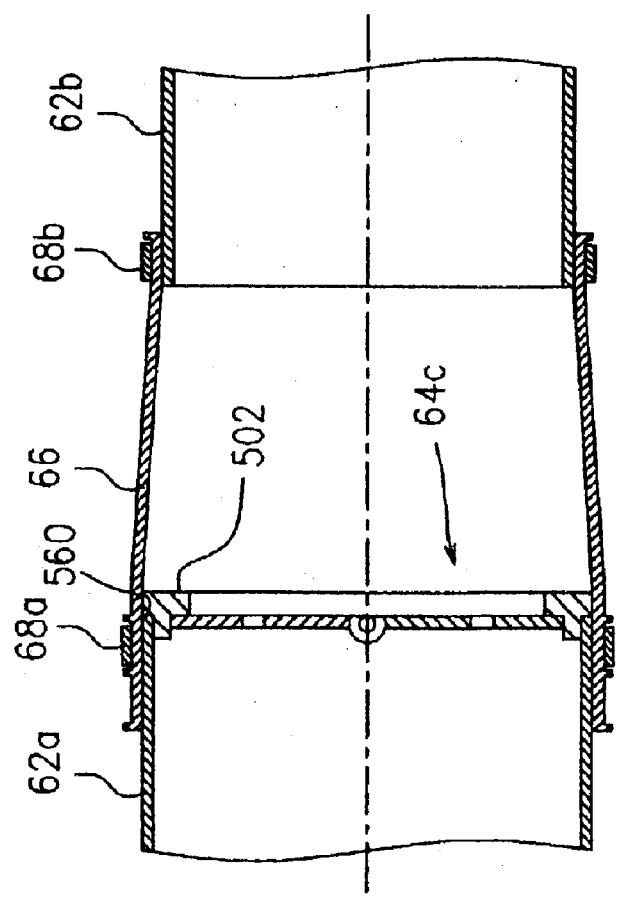

In still further embodiments illustrated in FIGS. 9c and 9d, the valves 64c and 64d have support rings 502 and 602, respectively. The support ring 502 includes a step 560 such that the step 560 abuts the end of conduit 62a. A boot 66 is fitted at its large end, over the conduit 62a/valve 64c assembly and is secured thereto by a band clamp 68a. The boot 66 is fitted at its small end, over an end of conduit 62b and is secured thereto by band clamp 68b. The support ring 602 includes two steps 660 and 662 which define a shoulder 664 therebetween. The shoulder 664 is sandwiched between flanges 70a and 70b which are affixed to the ends of the respective conduits 62a and 62b. The flanges 70a and 70b are secured together by well known means (not shown). The steps 660 and 662 are different in diameters in order to ensure correct orientation of the valve 64d. The embodiments illustrated in FIGS. 9c and 9d show the alternative configuration of the support rings in order to fit different conduit structures. These configurations of support rings can be combined with various configurations of flap members, such as those illustrated in FIGS. 1 and 2 and 4–5.

Modifications and improvements to the above-described embodiments of the present invention may become apparent to those skilled in the art. For example, the present valve may be incorporated in a gas turbine engine using a forced air system to cool the generators, and would be particularly useful if the fan were operating continuously. As shown in FIG. 10, an aircraft gas turbine engine 10a includes the generator 56, gear box 58 and the cooling conduit 62 installed in the annular casing 32 of the engine core. The valve 64 which is mounted within the conduit 62 is therefore mounted in the engine core rather than in the nacelle 44.

In fact, application of the present invention is not limited for use with passive air cooling systems, nor electrical generators of gas turbine engines. The valve can be used as part of any system of aircraft engines designed for any purpose where there is a need to bleed bypass air, for example for cooling, but also for any other purpose. Therefore, the foregoing description is intended to be exemplary rather than limiting. The scope of the invention is therefore intended to be limited solely by the scope of the appended claims.

We claim:

1. A passive air cooling apparatus for an aircraft-mounted gas turbine engine for cooling at least a portion of an engine system to be cooled, the gas turbine engine having an air flow passing therethrough, the cooling apparatus comprising:

a conduit adapted for diverting a cooling air flow from the airflow to the at least a portion of the engine system to be cooled;

a support structure adapted to be mounted within the conduit;

at least one flap member pivotally mounted to the support structure, the at least one flap member being pivotable between an first position for a minimum cooling airflow passage and a second position for a maximum cooling airflow passage; and a torsion spring attached to the at least one flap member to urge the same to pivot against an air pressure differential, from the first position to the second position when the air pressure differential is smaller than a predetermined level.

2. A passive air cooling apparatus as claimed in claim 1 wherein the torsion spring is disposed such that an axis of the torsion spring is superposed on an pivoting axis of the at least one flap member.

3. A passive air cooling apparatus as claimed in claim 2 wherein the torsion spring is a coiled torsion spring surrounding a shaft on which the at least one flap member is pivotally mounted.

4. A passive air cooling apparatus as claimed in claim 2 wherein the support structure comprises an external periphery substantially fit into a corresponding structure of the conduit.

5. A passive air cooling apparatus as claimed in claim 4 wherein the support structure comprises an axial dimension thereof substantially smaller than a diametrical dimension thereof.

6. A passive air cooling apparatus as claimed in claim 5 wherein the at least one flap member, when in the first position extends transversely with respect to the conduit and forms the minimum cooling airflow passage within the conduit.

7. A gas turbine engine adapted to be mounted on an aircraft, the gas turbine engine having an airflow passing therethrough and including a passive air cooling apparatus for cooling at least a portion of an engine system to be cooled, the cooling apparatus comprising:

a conduit mounted on the gas turbine engine, adapted to divert a cooling airflow from the airflow to the at least a portion of the engine system to be cooled; and a valve disposed in the conduit, the valve being positionable between a terminal first position in which the cooling airflow through the conduit is partially blocked by the valve, and a second position in which the cooling airflow through the conduit is substantially unblocked by the valve, the valve being biased towards the second position, wherein when a pressure differential sufficient to overcome the biasing of the valve towards the second position is applied across the valve in the conduit, the valve is moved by the pressure differential to the first position.

8. A gas turbine engine as claimed in claim 7 wherein the valve is in the terminal first position when the gas turbine engine is operated for an aircraft takeoff or flight condition.

9. A gas turbine engine as claimed in claim 7 wherein the valve is in the second position when the gas turbine engine is operated for an idle or aircraft taxiing condition.

10. A gas turbine engine as claimed in claim 7 wherein the valve comprises:

a support ring adapted to be mounted within the conduit, the support ring including a shaft extending diametrically across and being secured to the support ring;

two flap members pivotally mounted to the shaft and being pivotable between the terminal first position and the second position; and a spring means for biasing the flap members towards the second position.

11. A gas turbine engine as claimed in claim 10 wherein the flap members comprise cutouts forming a minimum cooling airflow passage when the flap members extend radially across the conduit in the terminal first position.

* * * * *